United States Patent [19]
DeDoncker et al.

[11] Patent Number: 5,648,894
[45] Date of Patent: Jul. 15, 1997

[54] ACTIVE FILTER CONTROL

[75] Inventors: Rik Wivina Anna Adelson DeDoncker, Schenectady; Paul Michael Szczesny, Burnt Hills, both of N.Y.

[73] Assignee: General Electric Company, Schenectady, N.Y.

[21] Appl. No.: 315,473

[22] Filed: Sep. 30, 1994

[51] Int. Cl.$^6$ ................................................. H02M 1/12
[52] U.S. Cl. ................................................. 363/39
[58] Field of Search ................................ 363/40, 43, 35, 363/37, 41, 71, 97, 98; 323/207, 208, 209, 210; 307/105

[56] References Cited

U.S. PATENT DOCUMENTS

| | | | |
|---|---|---|---|
| 3,825,814 | 7/1974 | Stacey et al. | 307/295 |
| 3,849,677 | 11/1974 | Stacey et al. | 307/295 |
| 4,053,820 | 10/1977 | Peterson et al. | 363/44 |
| 4,224,660 | 9/1980 | Mohan | 363/48 |
| 4,757,415 | 7/1988 | Smith et al. | 361/76 |
| 4,812,669 | 3/1989 | Takeda et al. | 307/105 |
| 4,835,411 | 5/1989 | Takeda | 307/105 |
| 4,906,860 | 3/1990 | Asaeda | 307/105 |
| 5,162,983 | 11/1992 | Kumagai | 363/39 |
| 5,172,009 | 12/1992 | Mohan | 370/46 |
| 5,280,421 | 1/1994 | DeDoncker et al. | 363/98 |
| 5,355,025 | 10/1994 | Moran et al. | 307/105 |

OTHER PUBLICATIONS

DeDoncker et al, "Active Filter Control"; U.S. Ser. No. 08/315,473 (Docket RD 23,169).
H. Akagi, et al., "Instantaneous Reactive Power Compensators Comprising Switching Devices without Energy Storage Components," IEEE Transactions on Industry Applications, vol. IA-20, No. 3, May/Jun. 1984, pp. 625–630.
F.Z. Peng, et al., "A Novel Harmonic Power Filter," PESC '88 Record (Apr. 1988), pp. 1151–1159.
Quinn, et al., "Active Filtering of Harmonic Currents in Three-Phase, Four-Wire Systems ... ", APEC Proceedings, pp. 829–836.
C. Quinn, et al., "A Four-Wire, Current-Controlled Converter Provides Neutralization ... ", APEC 1993 Proceedings, pp. 841–846.

*Primary Examiner*—Aditya Krishnan
*Attorney, Agent, or Firm*—Marvin Snyder

[57] ABSTRACT

A set of command signals is generated for application to the respective lines of a four-wire three phase power distribution system to compensate for harmonic distortion and neutral unbalance. A transform operation is performed upon a first set of signals, which collectively represent the uncompensated load current in each of the main transmission lines of the power distribution system, to generate a second set of signals which collectively represent the active and reactive components of the current in the system. Signal components at the fundamental frequency of the three phase system are removed from the active and reactive components to provide only harmonic active and reactive components. A reverse transform operation is performed upon the harmonic components to provide a set of command signals.

13 Claims, 7 Drawing Sheets

ACTIVE FILTER CONTROL

BACKGROUND OF THE INVENTION

The invention disclosed and claimed herein generally pertains to active power filter devices for reducing distortion in three-phase power distribution and transmission systems. More particularly, the invention pertains to an apparatus and method for controlling an active filter which is coupled to a four-wire, three-phase system to provide compensation for both line harmonics and neutral unbalance.

When a three-phase power transmission or distribution system is coupled to certain kinds of loads, such as rectifier circuits feeding inverter drives and power supplies, substantial harmonic components of current and voltage can be generated in the lines of the distribution equipment. These harmonic components can, in turn, seriously affect other equipment connected to the system, causing, for example, outages of connected computers or light flicker in other equipment. Moreover, in a four-wire three-phase distribution system, a neutral wire is provided which is normally designed to carry only small unbalanced currents. However, if the harmonic component has a third harmonic, or other component which is a multiple of three, the current loading of the neutral wire can increase substantially. Also, higher frequency harmonics in the system tend to cause relatively higher losses due to skin effect. As a result, overheating can occur in a neutral wire, to such extent that a fire hazard is created unless the neutral wire is made much larger than would be required for balanced current operation.

In the past, passive filters, comprising inductors and capacitors, have been used to compensate for the effects of harmonic components in power distribution and transmission systems. More recently, with the advances in power electronic equipment, active power filters have been developed for this purpose because active filters can eliminate harmonic currents more precisely, and are stable over a wide generating range in the distribution network. A typical active power filter comprises a three-phase three-legged pulse width modulated (PWM) inverter and dedicated control. The semiconductor power switches of the three-legged inverter are driven in a PWM mode to generate a set of compensating currents, each of which is coupled to one of the lines of the distribution system. Each compensating current waveform is the same as the load current flowing through the corresponding line, except that the fundamental frequency component of the load current has been separated therefrom. Thus, when a compensating current is coupled to the line, it combines with the corresponding load current to eliminate the undesirable harmonic component in the line current source.

In a four-wire three-phase system unbalanced nonlinear loads can produce substantial neutral wire currents. To eliminate these neutral currents, a fourth phase leg, connected to the neutral wire, must be added to the inverter.

Figure 1:
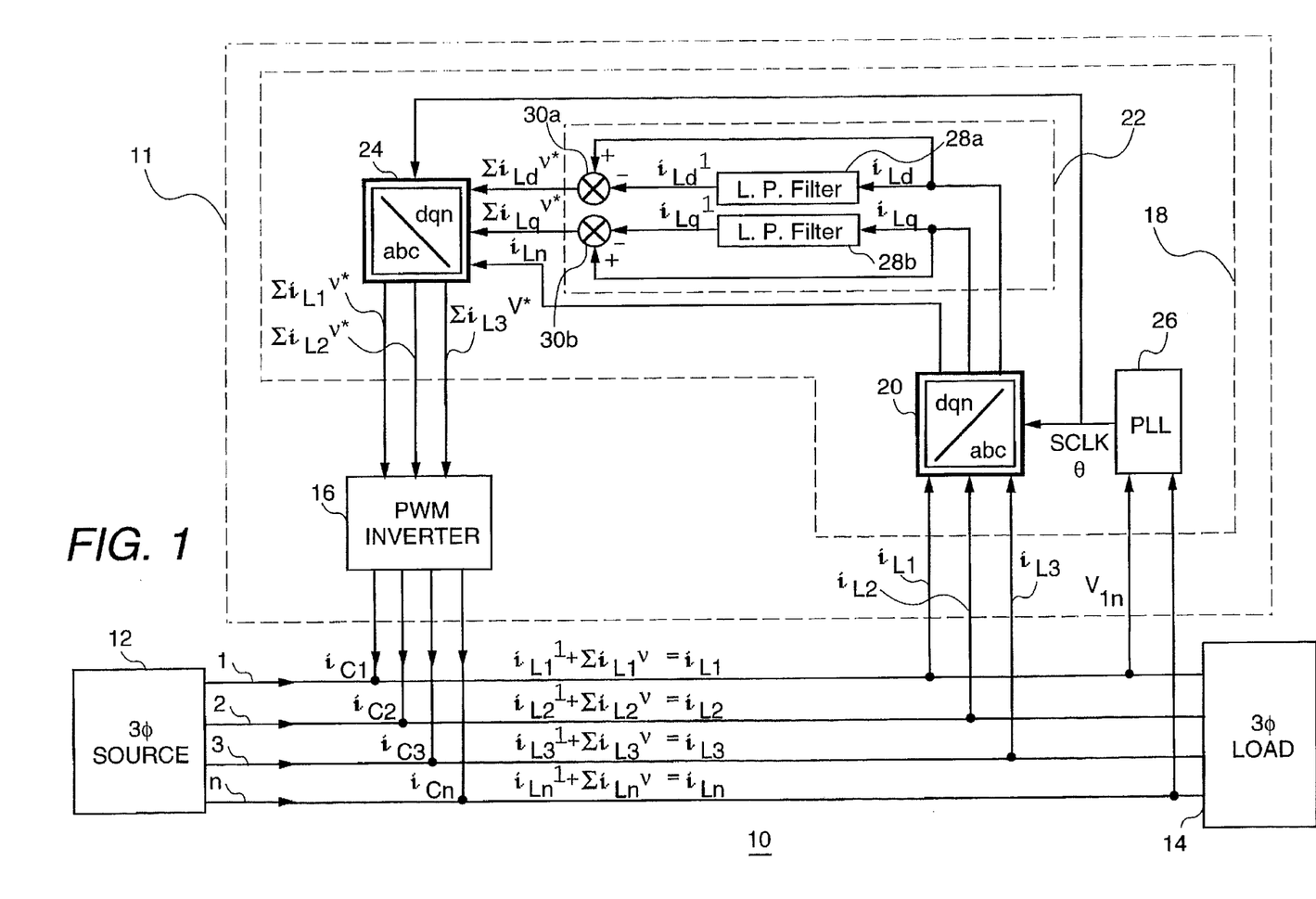
FIG. 1 is a block diagram showing a first embodiment of the invention.

Inverters of this type are exemplified by commonly assigned U.S. Pat. No. 5,280,421, issued to the present inventors on Jan. 18, 1994. FIG. 1 of such patent shows transistor switches $T_1$–$T_8$, which are respectively operated to generate the desired harmonic compensating currents for a four-wire, three-phase distribution system. Various techniques for computing the harmonic compensating currents have been proposed and are based on notch filters, Fourier transforms and instantaneous power calculations. However, it has now been recognized that improved means for controlling the operation of active filters must be developed, to meet new, more restrictive levels of tolerable harmonic distortion and to provide faster response. This is especially true in regard to low voltage distribution systems, (i.e., systems of 600 volts or less) which are used to supply power to computers or other equipment which are highly sensitive to voltage distortion. The present invention achieves this result by providing an active filter control which separates the fundamental frequency component from the compensating currents with more accuracy, precision and higher bandwidth than has generally been available. Also, the invention substantially simplifies such controls.

SUMMARY OF THE INVENTION

The present invention provides an apparatus and method for controlling an active power filter which is coupled to provide compensating currents to the respective wires of a four-wire, three-phase power distribution system to compensate for harmonic distortion and neutral unbalance.

In a preferred embodiment of the invention, a first transform means is coupled to receive a first set of signals, each signal in the first set representing the load current in one of three main power transmission lines of the distribution system. The first transform means transforms the first set of signals into a second set of signals which include the active and reactive components of the total current flowing through the distribution system. In the second set of signals, the signals at the fundamental frequency are transformed or modulated into direct current (dc) quantities. A low-pass filter receives the active and reactive components and removes signal components therefrom which are at the fundamental frequency of the distribution system to provide harmonic active and reactive components. A second transform means receives the harmonic active and reactive components, as well as a signal representing the current in the neutral line of the distribution system, and performs a reverse transform operation thereon to provide a set of active power filter command signals which are collectively disposed to drive the active filter to generate the harmonic distortion and neutral unbalance compensating currents, which are supplied to corresponding lines of the three-phase system. Preferably, each command signal has the same waveform as its corresponding compensating signal, and therefore need only be amplified to provide the compensating signal.

An object of the present invention is to provide an improved control for operating an active filter to more effectively reduce harmonic distortion and neutral unbalance in a three-phase, four-wire power distribution system.

Another object is to provide a control for operating an active filter by accurately and precisely separating the fundamental and harmonic load current components from each other in the process of generating current signals to compensate for harmonic distortion.

Another object is to provide a control for operating an active filter in a manner which eliminates the need for a notch filter, or like device, which must be matched to the fundamental frequency of the distribution system, in order to separate the fundamental component from the harmonic components, thereby eliminating substantial phase shift errors in the compensating signals and preventing slow dynamic response settling times.

Another object is to provide an active filter control which is substantially simplified in design and construction.

Another object is to provide an active filter control which, in combination with a high performance current regulator achieves improved accuracy and control bandwidth (up to the 25th harmonic), allowing use of relatively smaller and inexpensive filter inductors and capacitors.

DETAILED DESCRIPTION OF THE PREFERRED EMBODIMENT

FIG. 1 shows the four wires or lines of a four-wire, three-phase power distribution system 10, which includes a three-phase voltage source 12, and is coupled to a three-phase load 14. The four lines of distribution system 10 comprise three main lines 1–3 and a neutral line or wire n. $3\phi$ source 12 may comprise a transformer or other source of low voltage (typically less than 600 volts). An active power filter system 11 is coupled in parallel with system 10. Filter 11 comprises a PWM inverter 16 operated by a filter control 18, described hereinafter in greater detail. Other components of the three-phase distribution system, such as circuit breakers to connect other equipment besides load 14 to lines 1–3 and neutral n, are considered conventional and are not shown in the interests of simplification. Distribution system 10 with its active power filter is intended for use, for example, in products such as switchgear, switchboards, and panel-boards.

Lines 1–3 and n carry load currents $i_{L1}$, $i_{L2}$, $i_{L3}$ and $i_{Ln}$, respectively. As is well known to those of skill in the art, in an ideal three-phase system the currents in the three main lines 1–3 have phase angles of $\theta$, $\theta+\tfrac{2}{3}\pi$, and $\theta-\tfrac{2}{3}\pi$, respectively, and current in the neutral line is negligible. However, if load 14 is, for example, a rectifier circuit feeding an inverter drive, harmonics of the fundamental frequency of the current in lines 1–3 and n are generated therein. Thus, the current in line 1 is actually $i_{L1}=i_{L1}^{1}+\Sigma i_{L1}^{v}$, where $i_{L1}^{1}$ is the fundamental frequency component in line 1, and $\Sigma i_{L1}^{v}$ is the sum or spectrum of all harmonic components in line 1. Similarly, $i_{L2}=i_{L2}^{1}+\Sigma i_{L2}^{v}$, $i_{L3}=i_{L3}^{1}+\Sigma i_{L3}^{v}$ and $i_{Ln}=i_{Ln}^{1}+\Sigma i_{Ln}^{v}$, where $i_{L2}^{1}$, $i_{L3}^{1}$ and $i_{Ln}^{1}$ are the respective fundamental current components in lines 2, 3 and n, and $\Sigma i_{L2}^{v}$, $\Sigma i_{L3}^{v}$ and $\Sigma i_{Ln}^{v}$ are the collective harmonic components therein.

To eliminate the respective harmonic components from lines 1–3 and n, distribution system 10 is coupled to active power filter 11. Active filter 11 includes a PWM inverter 16, which may comprise, for example, the inverter shown in FIG. 5 and described hereinafter. PWM inverter 16 provides compensating currents $i_{c1}$, $i_{c2}$, $i_{c3}$ and $i_{cn}$ to lines 1–3 and n, respectively. Each compensating current equals the harmonic current components in its corresponding line. That is, $i_{c1}$, $i_{c2}$, $i_{c3}$ and $i_{cn}$ equal $\Sigma i_{L1}^{v}$, $\Sigma i_{L2}^{v}$, $\Sigma i_{L3}^{v}$, and $\Sigma i_{Ln}^{v}$, respectively. Thus the compensating currents cancel out the harmonic load current components, leaving only the fundamental component from distribution source 12.

In order to enable PWM inverter 16 to generate compensating currents which are highly accurate and precise over a wide frequency range, filter 11 includes an active filter control 18. FIG. 1 shows filter control 18 as generally comprising a first conversion device 20, a fundamental component filter 22, a second conversion device 24, and a phase locked loop 26. As will be described hereinafter in greater detail, conversion device 20 periodically samples the load currents at intervals of T/N, where T is the cycle time of the fundamental frequency of the load current, and N is the number of samples taken over one cycle of the fundamental frequency. Usefully, N is 256. Conversion device 24 produces a set of harmonic command signals $\Sigma i_{L1}^{v*}$, $\Sigma i_{L2}^{v*}$ and $\Sigma i_{L3}^{v*}$ at the same sampling rate, and in synchronization with conversion device 20. The command signals drive PWM inverter 16 to generate the compensating currents $i_{c1}$, $i_{c2}$, $i_{c3}$ and $i_{cn}$ as described hereinafter in greater detail.

FIG. 1 further shows phase locked loop 26 coupled to receive voltage $V_{1n}$ of line 1, which has the same fundamental frequency as the load current. As described hereinafter in conjunction with FIG. 6, phase locked loop 26 generates a sampling clock signal (SCLK) and a phase signal $\theta$ which are coupled to conversion devices 20 and 24. The sampling clock pulses occur at T/N intervals, one such pulse coinciding with the beginning of each fundamental cycle of line voltage $V_{ln}$. Thus the sampling clock signal, and any activities controlled thereby are in synchronization with the fundamental frequency of line voltage $V_{ln}$. $\theta$ is the phase of the voltage of line 1 at the beginning of each interval. $\theta$ varies from 0 to $2\pi$, in increments of $2\pi/N$, over one fundamental frequency cycle of $V_{ln}$.

Figure 2:
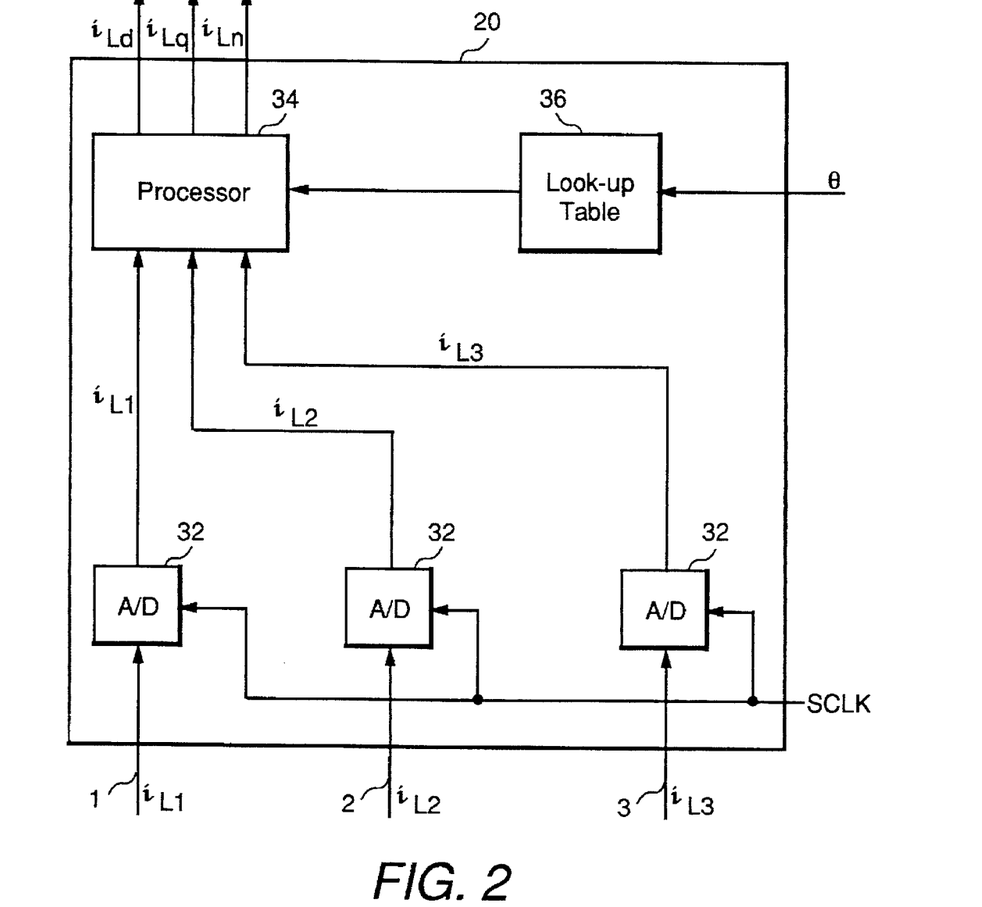
FIG. 2 is a block diagram showing a first signal conversion device for the embodiment of FIG. 1.

FIG. 2 shows conversion device 20 to include three analog to digital (A/D) converters 32, each receiving the load current from a separate respective one of lines 1–3. Each A/D converter 32 includes a circuit (not shown) which is controlled by the sampling clock signal to periodically sample and hold the corresponding line current, in synchronization with the fundamental frequency of lines 1–3, and in phase with the voltage of line 1. Output pulses of A/D converters 32, comprising the respective line currents in the form of a continual stream of digitized samples, are supplied to a processor 34, which is operated at the same clock rate.

Figure 4:
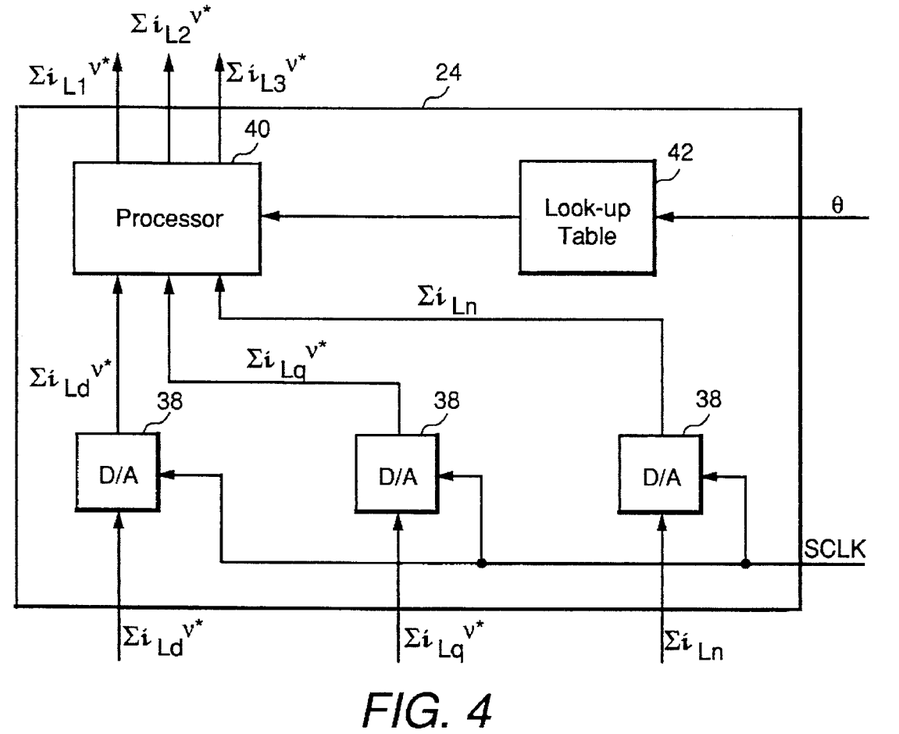
FIG. 4 is a block diagram showing a second signal conversion device for the embodiment of FIG. 1.

Processor 34 transforms currents $i_{L1}$, $i_{L2}$ and $i_{L3}$ into a set of signals $i_{Ld}$, $i_{Lq}$ and $i_{Ln}$, respectively, each also comprising a stream of digitized samples. This transform operation is known as an "abc" to "dqn" transformation, or a transformation from a stationary reference to a synchronous reference. This transform is defined by the following equation (shown in matrix form):

$$\begin{bmatrix} i_{Ld} \\ i_{Lq} \\ i_{Ln} \end{bmatrix} = \qquad (1)$$

$$\frac{2}{3} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \\ 1/2 & 1/2 & 1/2 \end{bmatrix} \begin{bmatrix} i_{L1} \\ i_{L2} \\ i_{L3} \end{bmatrix}$$

$$\begin{bmatrix} \Sigma i_{L1}^* \\ \Sigma i_{L2}^* \\ \Sigma i_{L3}^* \end{bmatrix} = \begin{bmatrix} \cos\theta & -\sin\theta & 1 \\ \cos\left(\theta - \frac{2\pi}{3}\right) & -\sin\left(\theta - \frac{2\pi}{3}\right) & 1 \\ \cos\left(\theta + \frac{2\pi}{3}\right) & -\sin\left(\theta + \frac{2\pi}{3}\right) & 1 \end{bmatrix} \begin{bmatrix} \Sigma i_{Ld}^* \\ \Sigma i_{Lq}^* \\ i_{Ln} \end{bmatrix} \quad (2)$$

Processor 34 may comprise a computer which is suitably programmed to perform the comparatively simple multiplication and addition operations specified by Equation (1) on successive samples of currents $i_{L1}$, $i_{L2}$ and $i_{L3}$ to provide the corresponding samples of $i_{Ln}$, $i_{Lq}$ and $i_{Ld}$, respectively. The time required for successive calculations may be substantially reduced by storing many different parameter values for the sine and cosine expressions in Equation (1), as specified by various possible values of $\theta$, in a look-up table 36. Look-up table 36 may comprise, for example, a 256×6 memory array for storing different parameters determined by angle $\theta$.

Figure 3:
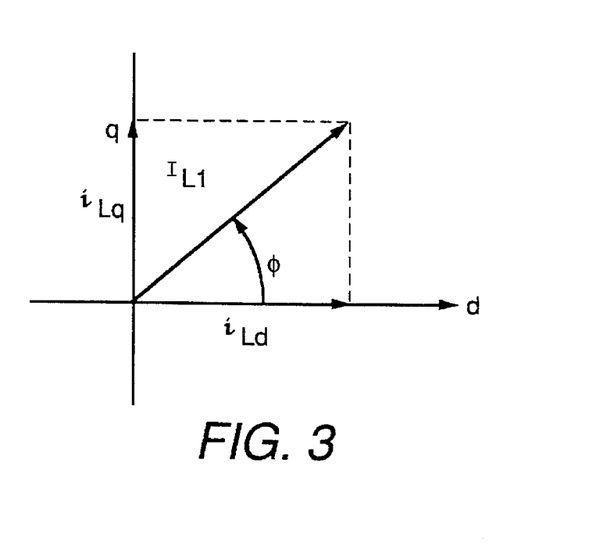
FIG. 3 is a phasor diagram representing the load current flowing through a three-phase power distribution system coupled to the embodiment shown in FIG. 1.

If the currents flowing through lines 1, 2 and 3 of distribution system 10 are balanced relative to one another and include only a component of fundamental frequency, the corresponding transformed components $i_{Ld}$ and $i_{Lq}$ are dc quantities, and the component $i_{Ln}$ ("neutral component") is equal to zero. Moreover, $i_{Ld}$ and $i_{Lq}$ correspond in steady state to the active and reactive portions, respectively, of line currents $i_{L1}$, $i_{L2}$, $i_{L3}$ flowing through lines 1–3, respectively, of distribution system 10. This is illustrated in FIG. 3, which shows the total current $i_{L1}$ as a phasor having an angle $\phi$, the phase displacement angle between voltage and line current of line 1.

If load 14 imposes harmonic components on lines 1–3, components $i_{Ld}$ and $i_{Lq}$ each have a dc component with a ripple imposed thereon. The dc components of $i_{Ld}$ and $i_{Lq}$ can be separated from the ripple components thereof by comparatively simple means, as is well known in the art.

FIG. 1 shows components $i_{Ld}$ and $i_{Lq}$ provided to low pass filters 28a and 28b, respectively. Preferably, each of filters 28a and 28b is designed to continually determine the average value of all $i_{Ld}$ and $i_{Lq}$ samples taken over the fundamental cycle period. More specifically, each time a filter receives a new sample, it produces the average value of the 256 most recently received samples. Such average or mean value is produced with cancellation of the ripple effects, and thus represents the respective dc components of $i_{Ld}$ and $i_{Lq}$, which are only the fundamental components $i_{Ld}^1$ and $i_{Lq}^1$. Component $i_{Ld}^1$ is subtracted from component $i_{Ld}$ in a summer 30a to provide a signal $\Sigma i_{Ld}^{v*}$ representing only the harmonic components of signal $i_{Ld}$. Similarly, component $i_{Lq}^1$ is subtracted from component $i_{Lq}$ in a summer 30b to provide a signal $\Sigma i_{Lq}^{v*}$ representing only the harmonic components of signal $i_{Lq}$. FIG. 4 shows conversion device 24 as comprising digital to analog (D/A) converters 38 coupled to a processor 40 and a look-up table 42. Processor 40 receives signals $i_{Ln}$, $\Sigma i_{Lq}^{v*}$ and $\Sigma i_{Ld}^{v*}$ and performs a reverse transform operation thereon to generate harmonic command signals $\Sigma i_{L1}^{v*}$, $\Sigma i_{L2}^{v*}$ $\Sigma i_{L3}^{v*}$, respectively. This reverse transform operation is defined by the following equation (shown in matrix form)

Each of D/A converters 38 includes a sample and hold circuit (not shown) which is controlled by the sampling clock signal to periodically measure and hold signals $\Sigma i_{Ld}^{v*}$, $\Sigma i_{Lq}^{v*}$ and $i_{Ln}$ in synchronization with the fundamental frequency on lines 1, 2 and 3 (FIG. 1), and in phase with the voltage on line 1. The reverse transform operation performed by processor 40 is known as a "dqn" to "abc" transformation, or a transformation from a synchronous reference to a stationary reference.

Processor 40 may comprise a computer suitably programmed to perform the comparatively simple multiplication and addition operations specified by Equation (2) on a stream of digitized signals $\Sigma i_{Ld}^{v*}$, $\Sigma i_{Lq}^{v*}$ and $i_{Ln}$ to provide the respective harmonic command signals. The time required for successive calculations may be substantially reduced by storing many different parameter values for the sine and cosine expressions in Equation (2), as specified by various possible values of $\theta$, in look-up table 42. Look-up table 42 may comprise, for example, a 256×6 memory array similar to look-up table 36.

The harmonic command signals respectively correspond to load currents $i_{L1}$, $i_{L2}$ and $i_{L3}$ when the fundamental components have been removed therefrom. That is, each command signal $\Sigma i_{L1}^{v*}$, $\Sigma i_{L2}^{v*}$, $\Sigma i_{L3}^{v*}$ has the same waveform as its corresponding spectrum of harmonic components $\Sigma i_{L1}^v$, $\Sigma i_{L2}^v$, $\Sigma i_{L3}^v$, respectively, and therefore also the same as its corresponding compensating current $i_{c1}$, $i_{c2}$, $i_{c3}$, respectively. Thus PWM inverter 16, as shown in FIG. 1 and which receives the harmonic command signals, may simply be a device for accurately amplifying the command signals to provide corresponding compensating currents $i_{c1}$, $i_{c2}$, $i_{c3}$. Current $i_{cn}$ is also provided thereby, since $i_{cn} = i_{c1} + i_{c2} + i_{c3}$. Inverter 16 may comprise one of a number of devices known in the art and which is adapted for use with a four-wire, three-phase power distribution system. For example, inverter 16 may comprise the inverter shown in FIG. 1 of U.S. Pat. No. 5,280,421, referred to above. In such inverters, command signals are employed to selectively change the conditions of switches $T_1$–$T_8$ to generate currents having the same waveforms as the respective command signals.

Figure 5:
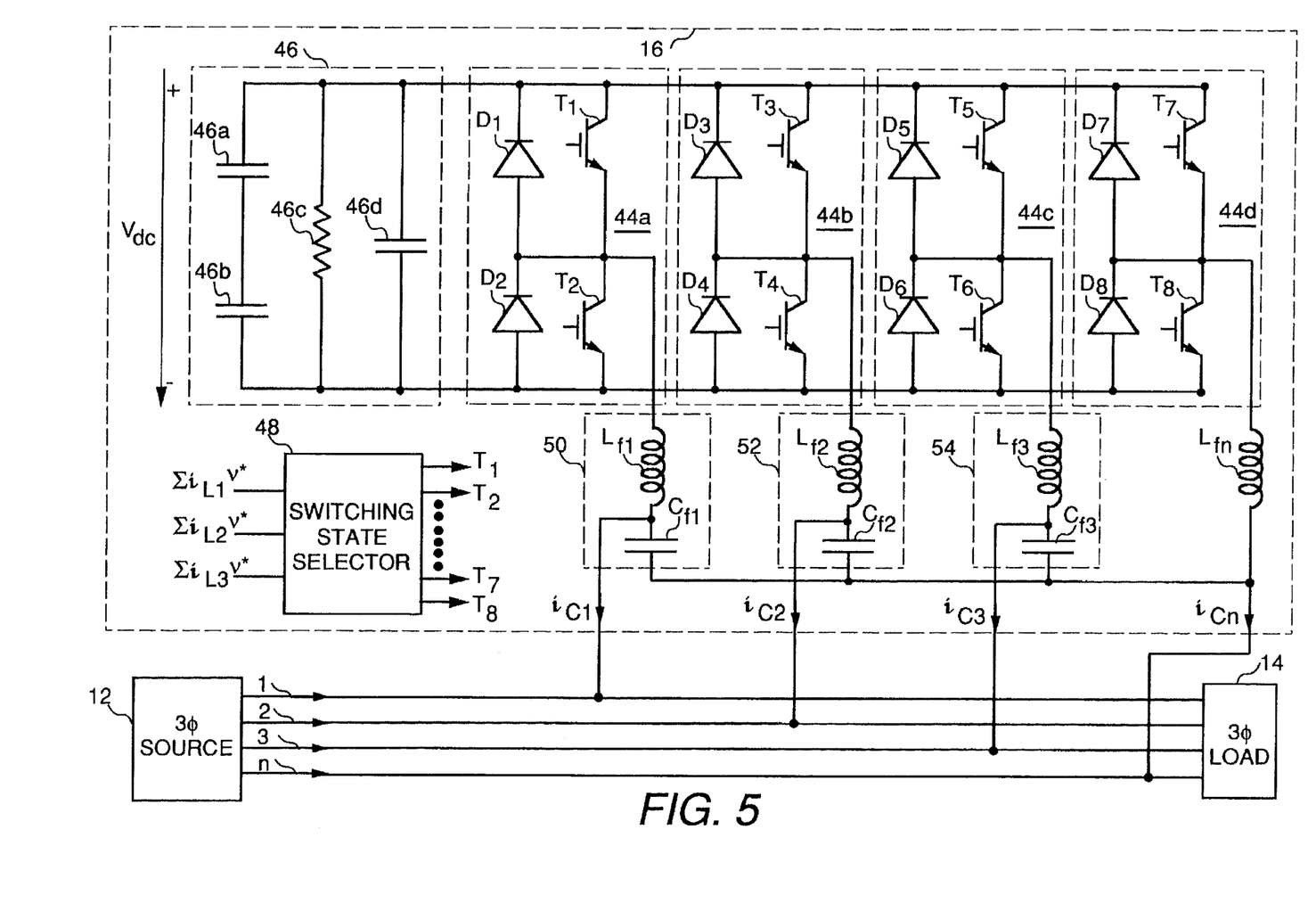
FIG. 5 is a schematic diagram showing an inverter for the invention as shown in FIGS. 1 and 7.

FIG. 5 shows a PWM inverter 16 which is similar to the inverter shown in FIG. 1 of the U.S. Pat. No. 5,280,421. However, the inverter of FIG. 5 is configured to eliminate the requirement for an independent dc voltage bus in order to provide a voltage $V_{dc}$. In FIG. 5, inverter 16 is shown as a four-legged inverter designed to provide a compensating current for each of lines 1–3 and n of a four-wire, three-phase system. The inverter of FIG. 5 further includes a dc bus 46, with series-coupled capacitors 46a and 46b, a discharge resistor 46c in parallel with the series-coupled capacitors, and a clamping capacitor 46d also in parallel with the series-coupled capacitors. A switching state selector or current regulator 48 and passive LC filters 50, 52 and 54 are also included in PWM inverter 16.

Inverter 16 comprises transistor switches $T_1$–$T_8$ and diodes $D_1$–$D_2$ interconnected as shown to form switching circuits 44a–44d corresponding to respective lines of the three-phase distribution system. Thus, series-coupled transistor switches $T_1$ and $T_2$ and series-coupled diodes $D_1$ and $D_2$, with their junctions connected, form a switching circuit 44a for generating compensating current $i_{C1}$, which is provided to line 1 of distribution system 10 (FIG. 1). The harmonic command signals $\Sigma i_{L1}{}^{v*}$, $\Sigma i_{L1}{}^{v*}$, $\Sigma i_{L3}{}^{v*}$ are supplied to selector 48 to control the on or off conditions of transistor switches $T_1$–$T8$ by supplying appropriate signals to their gates, and thereby provide compensating currents $i_{C1}$, $i_{c2}$, $i_{C3}$ and $i_{Cn}$ having the respective relationships to the harmonic command signals referred to above. Switching state selector 48 may be constructed in accordance with the teachings of U.S. Pat. No. 5,280,421, particularly FIG. 4 thereof and the associated description.

FIG. 5 further shows the output of switching circuit 44a coupled through a passive filter 50 comprising a series-connected inductor $L_{f1}$ and capacitor $C_{f1}$ to provide compensating current $i_{C1}$ at their junction In like manner, the output of switching circuit 44b is coupled through a passive filter 52 comprising a series-connected inductor $L_{f2}$ and capacitor $C_{f2}$, and the output of switching circuit 44c is coupled through a filter comprising a series-connected inductor $L_{f3}$ and capacitor $C_{f3}$, to provide compensating currents $i_{C2}$ and $i_{C3}$, respectively. The output of circuit 44d is coupled through an inductor $L_{fn}$ to provide compensating current $i_{Cn}$.

Figure 6:
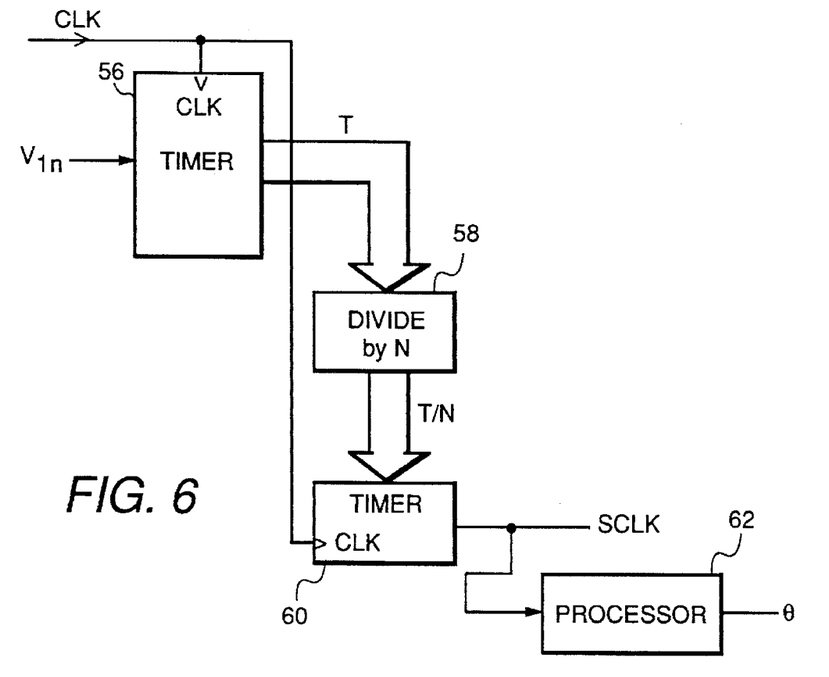
FIG. 6 is a phase locked loop for use in the embodiment of FIG. 1.

FIG. 6 shows a combination of elements which may be used as phase locked loop 26 to provide the phase angle θ and sampling clock signals referred to above. A timer 56 commences a timing operation each time the voltage $V_{1n}$ on line 1 makes a negative to positive zero crossing. Timing continues until the next-following negative to positive zero crossing. Thus, the output signal T of timer 56 represents exactly the period or cycle time of the fundamental frequency of the voltage and current of system 10.

A divider circuit 58 coupled to timer 56 divides the cycle time T by N, to provide the interval T/N. A signal from divider circuit 58 to a timer 60 enables timer 60 to produce a timing signal during each successive T/N interval, thereby prosampling closampling clock signal SCLK.

The sampling clock signal is also provided to a processor 62, which produces phase angle θ. Processor 62 initially sets θ to zero. Thereafter, processor 62 increments θ by 2 π/N each time a sampling clock pulse is received, at T/N intervals. When angle θ is updated to 2 π, processor 62 performs a modulus or wrap operation, to reset θ to a value of zero prior to the next-following clock pulse (i.e., $\text{MOD}_2$ $\pi(\theta)$).

Figure 7:
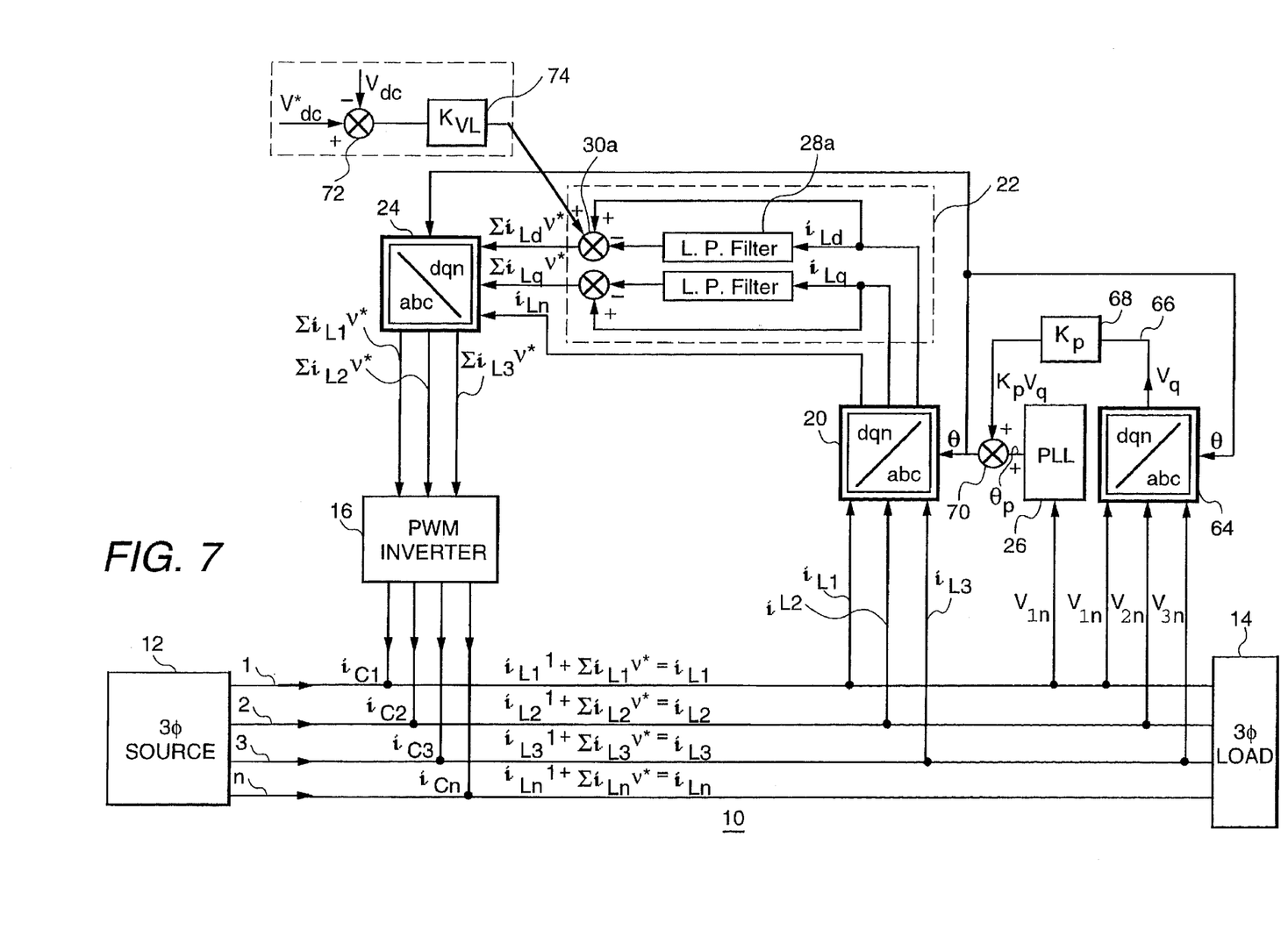
FIG. 7 is a block diagram showing a second embodiment of the invention.

FIG. 7 shows a modification of the invention wherein a conversion device 64 is coupled to receive voltage signals $V_{1n}$, $V_{2n}$, and $V_{3n}$, the voltages on lines 1–3, respectively. Conversion device 64 may be similar to conversion device 20, and performs an abc to dqn conversion to provide a voltage $V_q$, which is the reactive component of the total voltage of distribution system 10. Phase angle signal θ is provided to conversion device 64, as well as to conversion devices 20 and 24 for use in the transformation operation.

As is well known to those skilled in the art, if phase angle θ is the actual phase of line 1 voltage $V_{1n}$, voltage $V_q$ will be equal to zero. However, it is possible that phase locked loop 26 may cause a delay, so that θp, the phase angle output signal from phase locked loop 26, varies from θ. Accordingly, the modification shown in FIG. 7 includes a feedback loop 66, wherein a proportion-integral (PI) regulator 68 performs a multiplying function. Thus feedback loop 66 receives voltage $V_q$ from conversion device 64 and multiplies that voltage by a constant $K_p$ to provide a quantity $K_pV_q$ having the dimension of a phase angle. This quantity, if non-zero, is added to θp in a summer 70 to provide phase angle θ=θp+$K_pV_q$. Phase locked loop 26 is thus forced to synchronize with the phase voltage $V_{in}$ of the three phase distribution system 10.

FIG. 7 further shows a dc bus reference voltage $V_{dc}{}^*$ applied to a summer 72, which also receives the dc bus voltage $Vd_c$. The output signal of summer 72 ($V_{dc}{}^*$–$V_{dc}$) is applied to a PI regulator 74 to produce a regulating current $i_{dcReg}$=$K_{VL}$($V_{dc}{}^*$–$V_{dc}$). Current $i_{dcReg}$ is supplied to summer 30a, to vary filter harmonic command signal $i_{Ld}{}^{v*}$ as required to maintain a constant value of voltage $V_{dc}$ across inverter 16.

Figure 8:
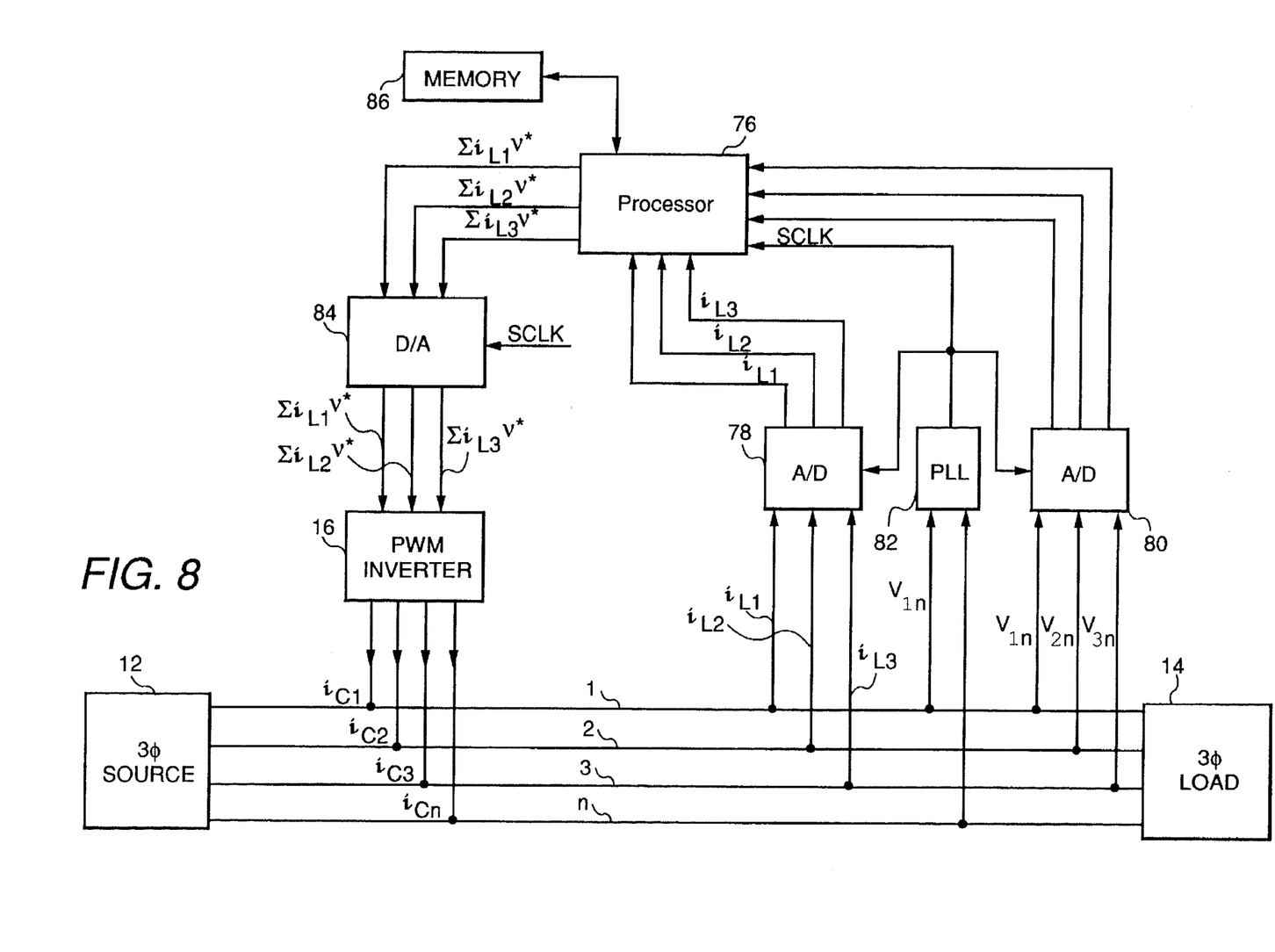
FIG. 8 is a block diagram showing a third embodiment of the invention.

Embodiments of the invention described above perform various computations in respective discrete or dedicated processors. However, in other embodiments of the invention, it may be preferable to perform all such computations in a single, suitably programmed processor. Accordingly, FIG. 8 shows an embodiment of the invention wherein a processor 76, such as the processor of a general purpose computer, receives load currents $i_{L1}$, $i_{L2}$, $i_{L3}$ and line voltages $V_{1n}$, $V_{2n}$, $V_{3n}$ from A/D converters 78 and 80, respectively. The embodiment of FIG. 8 includes a phase locked loop 82, which is similar to the phase locked loop shown in FIG. 6, except that phase locked loop 82 is not provided with a processor (such as processor 62 shown in FIG. 6) and only generates a sampling clock pulse at the beginning of each T/N interval. The sampling clock pulses are coupled to processor 76, A/D converters 78 and 80, and a D/A converter 84. Each successive sampling pulse causes processor 76 to execute a T/N interrupt Routine to compute the harmonic command signals $\Sigma i_{L1}{}^{v*}$, $\Sigma i_{L2}{}^{v*}$, $\Sigma i_{L3}{}^{v*}$. The harmonic command signals are converted to analog form by D/A converter 84 and supplied to inverter 16 as in the embodiments of FIGS. 1 and 7.

The embodiment of FIG. 8 further includes a memory 86 operable in connection with processor 76 to provide look-up tables 36 and 42, referred to above in conjunction with FIGS. 3 and 4, respectively.

Figure 9:
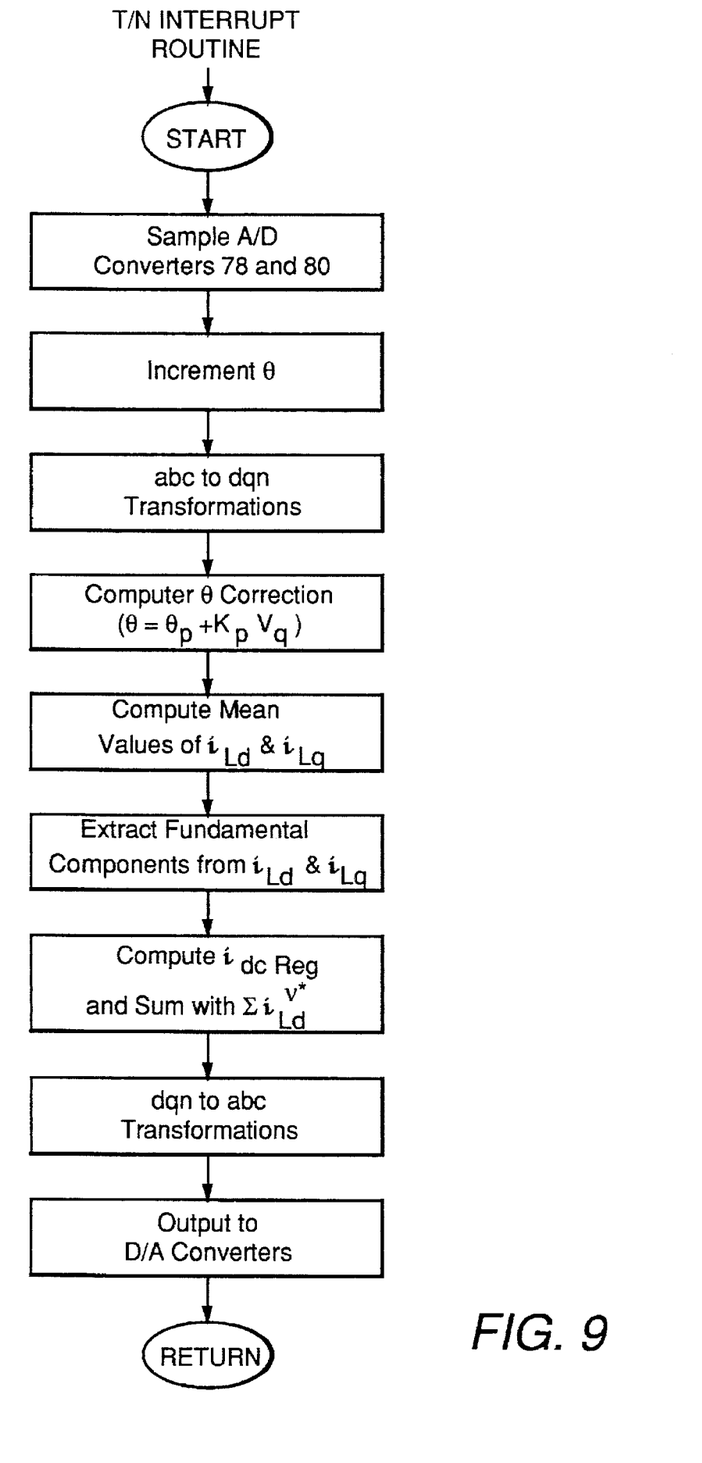
FIG. 9 shows the respective steps of a routine executed by the embodiment of FIG. 8.

FIG. 9 shows the respective steps of the T/N Interrupt Routine executed by processor 76 (of FIG. 8), at the beginning of each T/N interval. The steps are as follows:

STEP (1): A/D converters 78 and 80 are sampled to couple load currents $i_{L1}$–$i_{L3}$ and line voltages $V_{1n}$–$V_{3n}$ to processor 76.

STEP (2): The value of phase angle θ is updated from the previous value by 2 π/N, and a modulus or wrap operation, as described above, is performed if necessary.

STEP (3): abc to dqn transformations are performed to determine $i_{Ld}$, $i_{Lq}$, $i_{Ln}$ and $V_q$.

STEP (4): The θ correction value $K_pV_q$ is calculated and added to θ.

STEP (5): The average or mean values of the 256 most recently received samples of $i_{Ld}$ and $i_{Lq}$ are respectively computed, to determine fundamental components $i_{Ld}{}^1$, $i_{Lq}{}^1$.

STEP (6): Fundamental components $i_{Ld}{}^1$ and $i_{Lq1}$ are respectively extracted from $i_{Ld}$ and $i_{Lq}$ to provide $\Sigma i_{Ld}{}^{v*}$ and $\Sigma i_{Lq}{}^{v*}$.

STEP (7): Regulating current $i_{dcReg}$=$K_{VL}$ ($V_{dc}{}^*$–$V_{dc}$) is calculated and summed with $i_{Ld}{}^*$.

STEP (8): dqn to abc transformation is performed upon the signals $\Sigma i_{Ld}{}^{v*}$, $\Sigma i_{Lq}{}^{v*}$ and $i_{Ln}$ to provide the harmonic command signals $\Sigma i_{L1}{}^{v*}$, $i_{L2}{}^{v*}$, $\Sigma i_{L3}{}^{v*}$.

STEP (9): The harmonic signals are supplied from processor 76 to D/A converter 84, concluding the T/N Interrupt Routine.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. Apparatus for controlling a device coupled to provide compensating currents to a three-phase power distribution system having a fundamental frequency of operation, said system including three main power transmission lines and a neutral line, said control apparatus comprising:

first transform means for transforming a first set of signals, each signal thereof representing load current in a respective one of said main transmission lines, into a second set of signals which includes active and reactive components of current in said main transmission lines;

filter means for receiving said active and reactive components for removing therefrom components at said fundamental frequency to provide harmonic active and reactive components; and second transform means for receiving said harmonic active and reactive components and a signal representing neutral line current for performing a reverse transform operation thereon so as to provide a set of harmonic command signals, said harmonic command signals being collectively disposed to drive said device to generate line harmonic and neutral unbalance compensating currents for application to corresponding main power lines of said three-phase system.

2. The apparatus of claim 1 wherein:

said first transform means includes sampling means for sampling the load current at a sampling frequency which is a multiple of said fundamental frequency and means for transforming the load current samples acquired during one cycle of said fundamental frequency to corresponding sets of active component samples and reactive component samples; and wherein said filter means comprises means for determining a fundamental frequency active component representing the mean value of the samples in said active component set, and a fundamental frequency reactive component representing the mean value of the samples in said reactive component set.

3. The apparatus of claim 2 wherein:

said filter means further comprises means for subtracting said fundamental frequency active component from the samples of said active component set to provide said harmonic active component and means for subtracting said fundamental frequency reactive component from the samples of said reactive component set to provide said harmonic reactive component.

4. The apparatus of claim 3 wherein said sampling means comprises an analog to digital conversion means for operation at said sampling frequency.

5. The apparatus of claim 4 wherein:

said apparatus includes synchronizing means coupled to operate said analog-to-digital conversion means and said first and second transform means in synchronization with one another and in phase with voltage on a first one of said main transmission lines.

6. The apparatus of claim 5 wherein:

said synchronizing means comprises a phase locked loop responsive to said voltage on said first one if said main transmission lines.

7. The apparatus of claim 1 wherein said apparatus includes: third transform means for receiving voltage signals from each of the main transmission lines to provide a transformed voltage signal; and a feedback loop coupled between said third transform means and said phase locked loop to provide a phase correction when said transformed voltage signal is non-zero.

8. The apparatus of claim 1 wherein:

said first transform means comprises means for performing a transformation from a stationary reference to a synchronous reference, and said second transform means comprises means for performing a transformation from a synchronous reference to a stationary reference.

9. The apparatus of claim 1 wherein said filter means comprises: low-pass filters for providing output signals comprising only the fundamental frequency signal components of said active and reactive components; and means for extracting said output signals of said low-pass filters from said active and reactive components to provide said harmonic active and reactive components, respectively.

10. The apparatus of claim 1 wherein: said device comprises a PWM inverter requiring a dc bus voltage for its operation; said apparatus further including a feedback loop coupled between said filter means and said inverter to regulate said dc bus voltage to compensate for inverter losses.

11. Apparatus for providing compensating currents to a three-phase power distribution system having a fundamental frequency of operation, said apparatus comprising:

means for providing a first set of signals, each signal in said first set being indicative of load current in a respective phase of said system;

first means for transforming said first set of signals into first and second streams of digitized signal samples, each stream representing an active and a reactive component, respectively, of said load current;

means for subtracting the average value of each of said active and reactive components, respectively. of said load current, from said streams of digitized signal samples representing said active and reactive components, respectively, of said load current, to produce signals representing only harmonic components of said active and reactive components, respectively, of said load current;

means responsive to each of said first and second streams of digitized signal samples for determining the average value of said active and reactive components of said load current over a predetermined period;

means for performing a reverse transform operation on said harmonics of said active and reactive components of said load current to provide a set of harmonic command signals; and means coupled to said system and responsive to said harmonic command signals for generating said compensating currents for said system.

12. A method for generating a set of command signals for operating a four-legged inverter to provide harmonic distortion and neutral unbalance compensating signals to the respective lines of a three-phase power distribution system coupled to the inverter, said three-phase power distribution system including three main transmission lines and a neutral line, said method comprising the steps of:

performing a transform operation upon a first set of signals collectively representing uncompensated load current in each of the main transmission lines to generate a second set of signals collectively representing active and reactive components, respectively, of current in the three main transmission lines and the neutral line;

removing signal components at the fundamental frequency of the three-phase power distribution system from the active and reactive current components to provide only harmonics of the active and reactive current components, respectively; and performing a reverse transform operation upon a third set of signals comprising said harmonics of the active and reactive current components and a signal representing the neutral line current to provide said command signals.

13. The method of claim 12 wherein:

each leg of said inverter includes a switching circuit corresponding, respectively, to each of the main transmission lines and the neutral line of said power distribution system;

said method including the step of controlling respective states of said switching circuits in accordance with said command signals so as to generate said compensating signals.

* * * * *